United States Patent
Saito et al.

(10) Patent No.: US 7,286,725 B2
(45) Date of Patent: Oct. 23, 2007

(54) INFORMATION PRESENTATION APPARATUS FOR SUGGESTING A PRESENTATION ACCURACY OF RELATED INFORMATION AND INFORMATION PRESENTATION METHOD

(75) Inventors: Akito Saito, Hino (JP); Mikihiko Terashima, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/296,671

(22) Filed: Dec. 7, 2005

(65) Prior Publication Data
US 2006/0086797 A1    Apr. 27, 2006

Related U.S. Application Data (63) Continuation of application No. PCT/JP04/08388, filed on Jun. 9, 2004.

(30) Foreign Application Priority Data
Jun. 18, 2003    (JP)    ............... 2003-173361

(51) Int. Cl.
*G06K 9/03*    (2006.01)
*G06K 9/00*    (2006.01)

(52) U.S. Cl. ........................ 382/309; 382/151
(58) Field of Classification Search ................ 382/309, 382/151, 154
See application file for complete search history.

(56) References Cited

U.S. PATENT DOCUMENTS

| | | | |
|---|---|---|---|
| 6,389,182 B1 | | 5/2002 | Ihara et al. |
| 6,405,072 B1 | * | 6/2002 | Cosman ...................... 600/426 |
| 2002/0052709 A1 | * | 5/2002 | Akatsuka et al. ........... 702/153 |
| 2004/0046779 A1 | * | 3/2004 | Asano et al. ................ 345/716 |

FOREIGN PATENT DOCUMENTS

| | | |
|---|---|---|
| JP | 10-267671 | 10/1998 |
| JP | 2001-126051 | 5/2001 |
| JP | 2002-92647 | 3/2002 |

OTHER PUBLICATIONS

Takahashi, Akira et al., "A High Accuracy Realtime 3D Measuring Method of Marker for VR Interface by Monocular Vision", 3D Image Conference '96 preliminary reports, pp. 167-172.

* cited by examiner

*Primary Examiner*—Bhavesh M Mehta
*Assistant Examiner*—John B Strege
(74) *Attorney, Agent, or Firm*—Scully, Scott, Murphy & Presser, P.C.

(57) ABSTRACT

In an information presentation apparatus (for example, a camera-equipped PDA) which analyzes spatial stereotactic information on a target object in the real world and/or a predefined marker, and outputs predetermined related information (for example, a piping name) on a screen, suggestion information on the spatial stereotactic information of the target object in the real world and/or the predefined marker is output on the screen, in addition to the predetermined related information.

10 Claims, 5 Drawing Sheets

INFORMATION PRESENTATION APPARATUS FOR SUGGESTING A PRESENTATION ACCURACY OF RELATED INFORMATION AND INFORMATION PRESENTATION METHOD

CROSS REFERENCE TO RELATED APPLICATIONS

This is a Continuation Application of PCT Application No. PCT/JP2004/008388, filed Jun. 9, 2004, which was published under PCT Article 21(2) in Japanese.

This application is based upon and claims the benefit of priority from prior Japanese Patent Application No. 2003-173361, filed Jun. 18, 2003, the entire contents of which are incorporated herein by reference.

BACKGROUND OF THE INVENTION

1. Field of the Invention

The present invention relates to an information presentation apparatus and an information presentation method, which analyze spatial stereotactic information of a target object in the real world and/or a predefined marker, and output predetermined related information on a screen.

2. Description of the Related Art

As the information presentation apparatuses which present predetermined related information with respect to a target object in the real world and/or a predefined marker, bar-code readers have been extremely well known.

Among those, there is disclosed an apparatus which presents information by utilizing spatial information of a target object and/or a predefined marker in U.S. Pat. No. 6,389,182. The apparatus reads a two-dimensional code printed on a business card by a camera, and analyzes a bar-coded ID thereof by a program in a computer. Then, image data of a facial photograph of a person corresponding to the analyzed ID is read out of an image database, and the image data is displayed so as to be next to the two-dimensional code on the above-described image of the business card which has been captured by the camera and displayed on a computer display. In this way, a display is carried out as if the facial photograph is next to the two-dimensional code on the business card.

BRIEF SUMMARY OF THE INVENTION

According to a first aspect of the present invention, there is provided an information presentation apparatus comprising:
   a camera configured to capture at least one of a target object in the real world and a predefined marker, and to acquire an image including the at least on of the target object and the marker;
   a related information presentation unit configured to analyze spatial stereotactic information of the at least on of the target object and the marker included in the image on the basis of the image captured by the camera, and to output predetermined related information on the at least on of the target object and the marker on a screen; and
   a suggestion information presentation unit configured to output suggestion information on the analyzed spatial stereotactic information of the at least on of the target object in the real world and the predefined marker on the screen in addition to the predetermined related information.

Note that, in this specification, the term "target object in the real world" means a thing already existing in the real world, such as a structure such as a building and a house, a natural object such as a tree, an artificial object such as a traffic light, piping, and furniture. Further, "marker" means that various bar-codes, numerals, characters, and marks which are artificially set are surrounded by frames, or the like for outputs of an information presentation apparatus. However, the above-described target object in the real world as well is handled as a marker in a case of being registered as a marker for an output of an information presentation apparatus.

According to a second aspect of the present invention, there is provided an information presentation method comprising:
   capturing at least on of a target object in the real world and a predefined marker, and acquiring an image including the at least on of the target object and the marker;
   analyzing spatial stereotactic information of the at least on of the target object and the marker included in the image on the basis of the acquired image, and outputting predetermined related information on the at least on of the target object and the marker on a screen; and
   outputting suggestion information on the analyzed spatial stereotactic information of the at least on of the target object in the real world and the predefined marker on the screen in addition to the predetermined related information.

According to a third aspect of the present invention, there is provided an information presentation apparatus comprising:
   image pickup means for capturing at least on of a target object in the real world and a predefined marker, and for acquiring an image including the at least on of the target object and the marker;
   related information presentation means for analyzing spatial stereotactic information of the at least on of the target object and the marker included in the image on the basis of the image captured by the image pickup means, and for outputting predetermined related information on the at least on of the target object and the marker on a screen; and
   suggestion information presentation means for outputting suggestion information on the analyzed spatial stereotactic information of the at least on of the target object in the real world and the predefined marker on the screen in addition to the predetermined related information.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

A first embodiment of the present invention will be described with reference to FIGS. 1 to 3C.

Figure 1:
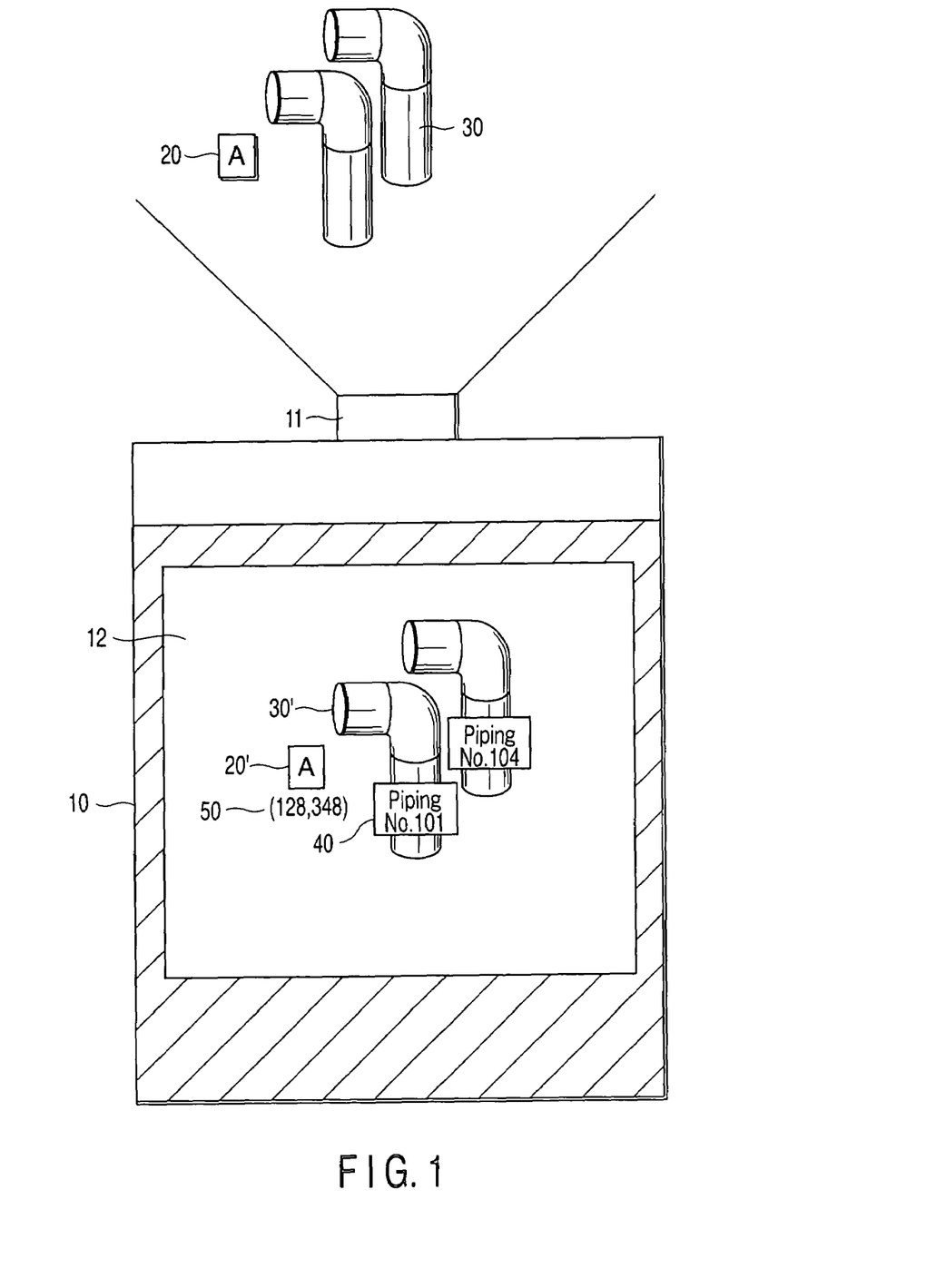
FIG. 1 is a diagram for explanation of an information presentation apparatus according to a first embodiment of the present invention.

As shown in FIG. 1, an information presentation apparatus according to the embodiment is configured as a personal digital assistance (PDA) 10 equipped with a camera 11. Further, suppose that a predefined marker 20 is, for example, that an alphanumeric character or a mark is surrounded with a rectangular frame.

The camera-equipped PDA 10 carries out operations as follows in accordance with internal program processing at the time of capturing the above-described predefined marker 20 and piping 30. Namely, spatial stereotactic information such as distortion and a size of the above-described predefined marker 20 in the captured image is analyzed by image processing. Then, a piping name 40 serving as related information registered in advance in the camera-equipped PDA 10 is displayed so as to be overlapped on an image 30' of corresponding piping on a screen 12 of the camera-equipped PDA 10.

Note that a technique for overlapping the related information on the captured marker 20 as described above can be easily realized by using a well-known method as follows, and therefore, description thereof will be omitted. Namely, as the above-described well-known method, a method for determining a positional posture of an image input unit on the basis of a position of a reference mark which is disclosed in "A High Accuracy Realtime 3D Measuring Method of Marker for VR Interface by Monocular Vision" (3D Image Conference '96 preliminary reports pp. 67-172 by Akira Takahashi, Ikuo Ishii, Hideo Makino, Makoto Nakashizuka, 1996), and a method for displaying related information in accordance with the viewpoint of an image input unit which is disclosed in Jpn. Pat. Appln. KOKAI Publication No. 2001-126051, have been known.

Figure 2A:
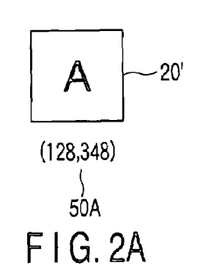
FIG. 2A is a diagram for explanation of coordinate values showing a position of an image of a marker, which has been analyzed as suggestion information.
Figure 2B:
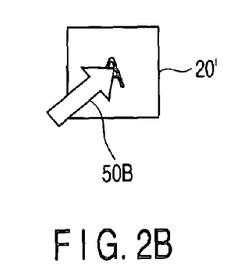
FIG. 2B is a diagram for explanation of an image of an arrow pointing a position of the image of the marker, which has been analyzed as suggestion information.
Figure 2C:
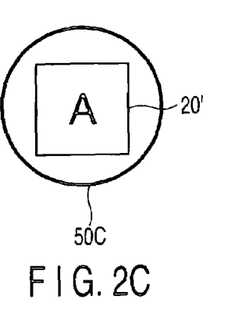
FIG. 2C is a diagram for explanation of a circle centering on a position coordinate of the image of the marker, which has been analyzed as suggestion information.

Further, in the embodiment, in addition to the piping name 40 serving as predetermined related information, suggestion information 50 relating to the spatial stereotactic information of the predefined marker 20 is output in the vicinity of an analyzed marker image 20' displayed on the screen 12 of the camera-equipped PDA 10. The suggestion information 50 relating to the spatial stereotactic information may be, for example, a coordinate value 50A denoting a position of the analyzed marker image 20' as shown in FIG. 2A, or may be an image 50B of an arrow pointing a position of the analyzed marker image 20' as shown in FIG. 2B. Further, various modifications, such as a circle 50C centering on the position coordinate of the analyzed marker image 20' as shown in FIG. 2C, an image 50D of a frame surrounding the analyzed marker image 20' as shown in FIG. 2D, and an image 50E making the inside of the frame surrounding the analyzed marker image 20' transparent as shown in FIG. 2E, can be considered.

Figure 2D:
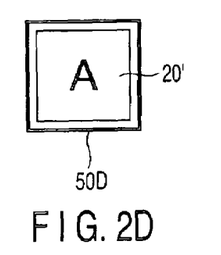
FIG. 2D is a diagram for explanation of an image of a frame surrounding the image of the marker, which has been analyzed as suggestion information.
Figure 2E:
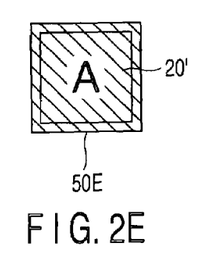
FIG. 2E is a diagram for explanation of an image making the inside of the frame surrounding the image of the marker, which has been analyzed, transparent as suggestion information.

Hereinafter, an example in which the image 50D of the frame surrounding the analyzed marker image 20' shown in FIG. 2D is displayed will be described.

Figure 3A:
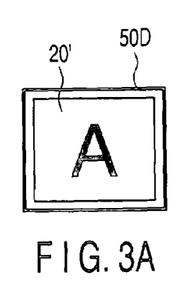
FIG. 3A is a diagram showing a presentation example of the image of the marker and the suggestion information in a case of having a high accuracy with respect to a positional relationship between the image of the marker and the suggestion information.

FIG. 3A shows a case in which the position of the image 50D of the frame surrounding the marker image 20' and serving as suggestion information of the spatial stereotactic information of the analyzed marker 20 and the position of the actual marker image 20' on the screen 12 are the same. In this case, it can be said that the predetermined related information to be presented is accurately presented.

Figure 3B:
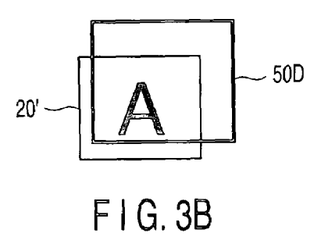
FIG. 3B is a diagram showing a presentation example of the image of the marker and the suggestion information in a case of having a moderate accuracy with respect to a positional relationship between the image of the marker and the suggestion information.
Figure 3C:
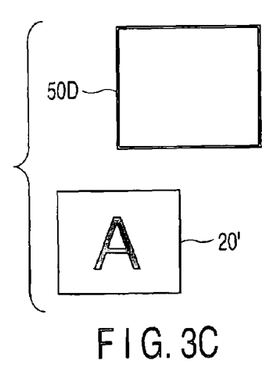
FIG. 3C is a diagram showing a presentation example of the image of the marker and the suggestion information in a case of having a low accuracy with respect to a positional relationship between the image of the marker and the suggestion information.

FIGS. 3B and 3C show cases in which there are differences between the position of the image 50D of the frame surrounding the marker image 20' and serving as suggestion information of the spatial stereotactic information of the analyzed marker 20 and the position of the actual marker image 20' on the screen 12. Such a case means that some inaccuracy is brought about in the predetermined related information to be presented. Additionally, the greater the difference becomes, the lower the accuracy becomes (gradually becomes inaccurate), and the less the difference becomes, the higher the accuracy becomes (becomes more accurate). With respect to the difference information, by merely displaying the image 50D of the frame surrounding the marker image 20' and serving as suggestion information of the spatial stereotactic information of the analyzed marker on the screen 12, it is possible for an operator to recognize displacement information with the actual marker image 20'. It goes without saying that it is possible to continuously display it on the screen 12, and because it is displayed on the screen 12 which the operator is monitoring from the beginning, it is not troublesome for the operator at all. Additionally, as described above, a difference and an accuracy have relevance to one another, and can be continuously expressed.

As described above, in the embodiment, it is possible to continuously inform an operator of the accuracy in the predetermined related information to be presented so as to be not troublesome for the operator, and so as to be easy to distinguish by continuous expressions.

Note that a dedicated processor may be used for all of respective portions and arithmetic sections configuring the respective portions in the embodiment, or a CPU into which a program has been loaded may calculate those. Further, in the embodiment, the information presentation apparatus, which outputs the predetermined, related information to the predefined marker 20 is used as an example. However, suggestion information on the spatial stereotactic information of the target object in the real world may be output in an apparatus which outputs the predetermined related information to a target object in the real world. Or, suggestion information on the spatial stereotactic information of the predefined marker 20 and the target object in the real world may be output in an apparatus which outputs the predetermined related information to the both of the predefined marker 20 and a target object in the real world.

Further, with respect to an information presentation apparatus, any apparatus which has an image input device which can input an image, and which can output information (images, characters, and the like) prepared by an image input by the image input device and internal processing on a screen is not limited to the camera-equipped PDA 10 as described above. For example, the present invention can be variously applied to a camera-equipped cellular phone, a camera-equipped PC, a camera-equipped tablet PC, and a dedicated device specialized for the above-described function. The actual structures of those may be considered in the same way as all of other embodiments, which will be described below.

Second Embodiment

Figure 4A:
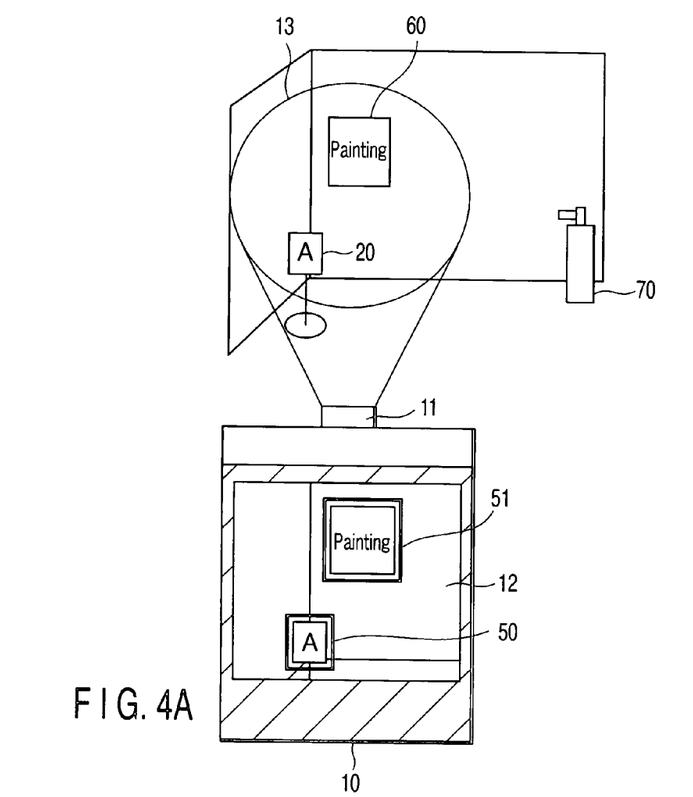
FIG. 4A is a diagram for an explanation of a case in which a target object, which is easy to distinguish as a mark is suggested in an information presentation apparatus according to a second embodiment of the invention.
Figure 4B:
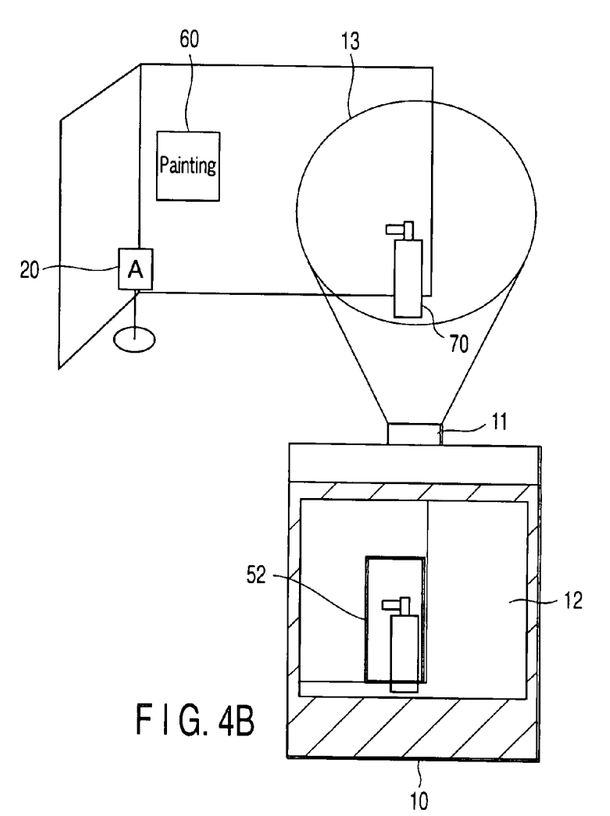
FIG. 4B is a diagram for explanation of a case in which a target object at a point away from a predefined marker by an angle of visual field of an image input apparatus or more is suggested in the information presentation apparatus according to the second embodiment.

Next, a second embodiment of the present invention will be described by using FIGS. 4A and 4B. In the present embodiment, suggestion information relates not only to the spatial stereotactic information of a target object in the real world and/or the predefined marker 20, but also to the spatial stereotactic information of an arbitrary target object. Concretely, as the suggestion information, information suggesting a target object easy to distinguish as a mark, and information suggesting a target object at a point away from the predefined marker 20 by an angle of visual field 13 of an image input device which is provided to the information presentation apparatus or more are set. In the examples of FIGS. 4A and 4B, a painting 60 is set as an example of a target object easy to distinguish as a mark, and a fire extinguisher 70 is set as a target object at a point away from the predefined marker 20 by an angle of visual field of the image input device or more. Note that "a point away from the predefined marker by an angle of visual field of the image input device or more" means a point away from the predefined marker 20 by a distance corresponding to the diameter of a circular region 13 which is a visual field on the plane surface determined by an angle of visual field of the image input device or more supposing a plane surface on which the predefined marker 20 exists. Namely, it is a point that is not within the visual field when the predefined marker 20 is captured within the visual field of the image input device.

As shown in FIG. 4A, when the predefined marker 20 and the painting 60 are captured by the camera 11 of the camera-equipped PDA 10, spatial stereotactic information such as distortion and a size of the predefined marker 20 are analyzed by image processing in accordance with program processing in the camera-equipped PDA 10. Then, the suggestion information 50 relating to the spatial stereotactic information of the predefined marker 20 and the suggestion information 51 relating to the spatial stereotactic information of the painting 60 are output on the screen 12 of the camera-equipped PDA 10.

Next, as shown in FIG. 4B, the fire extinguisher 70 is captured by the camera 11 of the camera-equipped PDA 10. In this case, because the fire extinguisher 70 is away from the predefined marker 20 by an angle of visual field of the camera 11 of the camera-equipped PDA 10 or more. Therefore, only suggestion information 52 relating to the spatial stereotactic information of the fire extinguisher 70 is output on the screen 12 of the camera-equipped PDA 10.

As described above, by suggesting the target object easy to distinguish as a marker, accuracy of the predetermined related information to be presented, can be expressed so as to be more easy to distinguish for the operator. Further, the position of the target object is suggested, the position being at a point away from the predefined marker 20 by an angle of visual field of the image input device which is provided to the information presentation apparatus or more. Consequently, even when the predefined marker 20 is out of the visual field at the time of inputting an image by the information presentation apparatus, it is possible to inform the operator of an accuracy of the predetermined related information to be presented so as to be easier to distinguish for the operator.

Third Embodiment

Next, a third embodiment of the present invention will be described by using FIG. 5. In the embodiment, suppose that suggestion information is information (bold rectangular frame in FIG. 5: the image 50D of the frame surrounding the marker image 20' and serving as suggestion information of marker position) at a position in a given relative relationship with the position of the predetermined related information of the information presentation apparatus (a cube 41 in FIG. 5).

Figure 5:
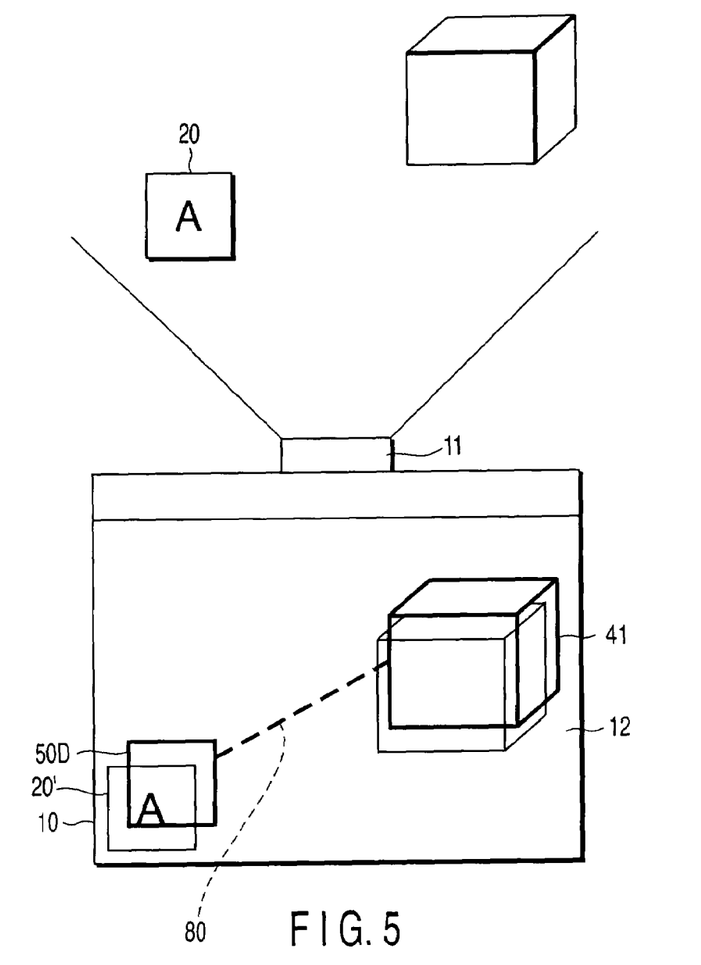
FIG. 5 is a diagram for explanation of an information presentation apparatus according to a third embodiment of the invention.

In this way, the suggestion information is in the given relative relationship with the related information (shown in dashed line 80 in FIG. 5). Accordingly, by observing a difference between the positions of the suggestion information and the actual target object or the marker 20 on the screen 12, an accuracy of the related information can be evaluated, in not only the value, but also in the direction thereof.

For example, as shown in FIG. 5, when the actual marker image 20' is in the lower left than the suggestion information (50D) in the screen 12 of the camera-equipped PDA 10, it is possible to estimate that the correct position of the cube 41 serving as predetermined related information is slightly in the lower left than the displayed one.

Fourth Embodiment

Next, a fourth embodiment of the present invention will be described by using FIGS. 6A and 6B. In the embodiment, suppose that predetermined related information of the information presentation apparatus is information 90 denoting a spatial distribution status of an arbitrary phenomenon, for example, a distribution of dust in space.

Because a spatial distribution status of dust changes in various distributions, it is difficult to distinguish at first glance whether or not the displayed positions are accurate in a case of displaying those on a screen. However, as shown in FIGS. 6A and 6B, by observing a difference between an actual position of the marker 20 and information suggesting the marker 20, an accuracy of the related information can be understood so as to be easy to distinguish.

Figure 6A:
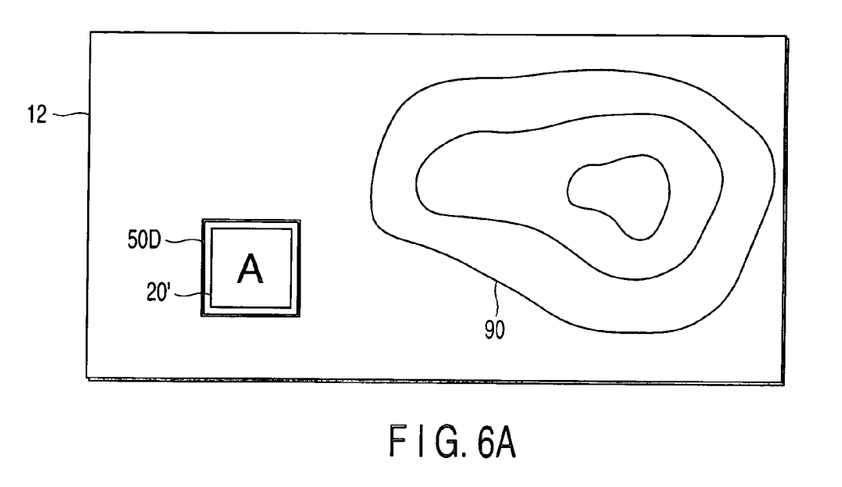
FIG. 6A is a diagram showing a display example when suggestion information at a marker position and a position of an image of the marker are the same in an information presentation apparatus according to a fourth embodiment of the present invention.
Figure 6B:
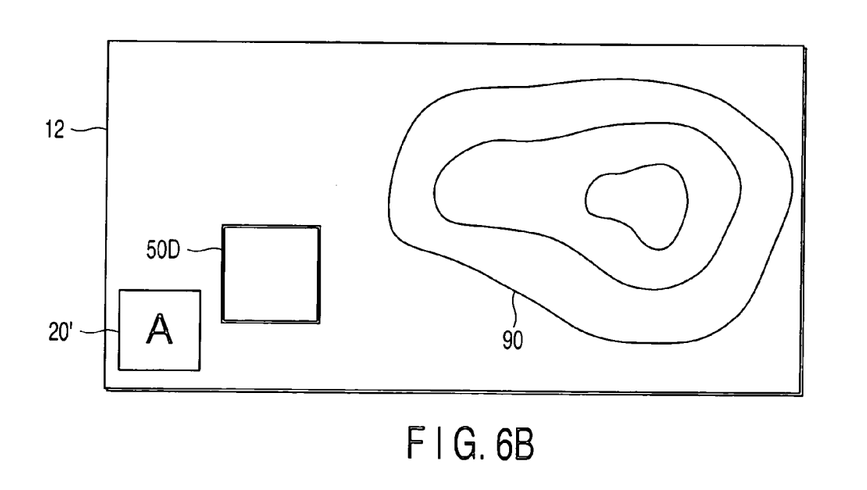
FIG. 6B is a diagram showing a display example when the suggestion information at the marker position and the position of the image of the marker are greatly deviated from the alignment in the information presentation apparatus according to the fourth embodiment.

For example, as shown in FIG. 6A, when the suggestion at the marker position (the image 50D of the frame surrounding the marker image 20') and the position of the actual marker image 20' are the same, it can be thought that the position of the displayed related information (the information 90 denoting a distribution of dust in space) is correct. However, as shown in FIG. 6B, it is possible to estimate that the position of the related information when both are greatly deviated from the alignment is unreliable.

Note that the spatial distribution status of an arbitrary phenomenon is not limited to a distribution of dust in space as described above, for example, can be thought of as various types such as a temperatures distribution in space, and a radioactivity distribution in space.

Fifth Embodiment

Next, a fifth embodiment of the present invention will be described by using FIGS. 7A and 7B. In the embodiment, a screen output of the above-described suggestion information is varied in accordance with an analysis result of the spatial stereotactic information.

Concretely, as a result of analyzing the spatial stereotactic information, the suggestion information is output so as to blink on and off when it is determined that the accuracy of position is low or it is impossible to output stably (an output which can be stably obtained originally moves unstably), for example, due to the marker being recognized so as to miss the edges. In this way, it is possible to inform the operator of the accuracy of the predetermined related information to be presented so as to be easier to distinguish for the operator.

Figure 7A:
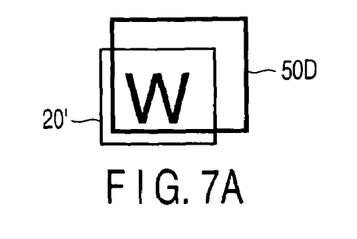
FIG. 7A is a diagram showing a screen output example in a case in which related information is output in a state of stable position in an information presentation apparatus according to an eighth embodiment of the invention.
Figure 7B:
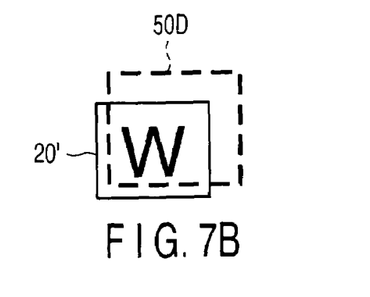
FIG. 7B is a diagram showing a screen output example in a case in which related information is output in a state of unstable position in the information presentation apparatus according to the eighth embodiment.

For example, the suggestion information of the marker position (the image 50D of the frame surrounding the marker image 20') is used differently in a display that does not blink as shown in FIG. 7A (shown in full line in the drawing), and in a blinking display as shown in FIG. 7B (shown in dashed line in FIG. 7B). In FIGS. 7A and 7B, the positional relationship between the positions of the suggestion information at the marker position and the actual marker image is substantially the same. In this way, by varying a screen output of the suggestion information, it can be shown that, in FIGS. 7A and 7B, although the accuracies in the related information positions of the both are at the same level, the former outputs the related information in a state of a stable position, and the latter outputs the related information in a state of an unstable position.

It goes without saying that a method for varying a screen output of suggestion information is not limited to such a blinking display, and may be one of a color, a brightness, a transmittance, a shape, and a choice between display/non-display, and moreover, those may be combined.

Further, when the information presentation apparatus has an audio output function or the like, at least one or more of on/off of audio signal, volume, high and low, and tone of audio may be varied in accordance with such a variation in a screen output.

The present invention is described above on the basis of the embodiments. However, it goes without saying that the present invention is not limited to the embodiments described above, and various modifications and applications are possible within a range, which does not deviate from the gist of the present invention.

For example, with respect to the suggestion information of the marker 20, the expression that the edges of the marker image 20' are surrounded is mainly used as an example. However, expressions that only the shape of a part thereof is traced (for example, only the corners of the frame are displayed), a portion of a part is painted out, and the like may be introduced.

Further, the present invention is described with a focus on letting the operator visually distinguish displacement by expressing it on the screen 12. However, a displacement measurement may be analyzed by image processing, and a deviation amount, a deviation direction, or the like may be displayed in an image of a text, a mark, or the like.

Moreover, a feedback mechanism for correcting a display of the information presentation apparatus by using the shift length may be provided.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information presentation apparatus comprising:
   a camera configured to capture both of a target object in the real world and a predefined marker, and to acquire an image including the both of the target object and the marker;
   a related information presentation unit configured to analyze spatial stereotactic information of the marker included in the image on the basis of the image captured by the camera, and to output predetermined related information on the target object; and
   a suggestion information presentation unit configured to output suggestion information suggesting the presentation accuracy of the related information wherein a displacement between the position of the suggestion information and that of the marker on the screen indicates the presentation accuracy of the related information.

2. The information presentation apparatus according to claim 1, wherein the suggestion information is at least one of an image and characters denoting one of positions and directions of the predefined marker.

3. The information presentation apparatus according to claim 1, wherein the suggestion information relates to the spatial stereotactic information of the predefined marker.

4. The information presentation apparatus according to claim 1, wherein the suggestion information is information existing at a given relative position from a position of the predetermined related information in the information presentation apparatus.

5. The information presentation apparatus according to claim 1, wherein the predetermined related information in the information presentation apparatus is information for making a spatial distribution status of a phenomenon visible.

6. The information presentation apparatus according to claim 1, wherein a screen output of the suggestion information is varied in accordance with an analysis result of the spatial stereotactic information in the information presentation apparatus.

7. The information presentation apparatus according to claim 6, wherein variation items of the screen output are at least one of a color, a brightness, a transmittance, a shape, and a choice between display/nondisplay.

8. The information presentation apparatus according to claim 6, the information presentation apparatus further comprising an audio output function, wherein at least one of on/off of audio signal, volume, high and low, and tone of the audio is varied in accordance with a variation in the screen output.

9. An information presentation method comprising:

capturing both of a target object in the real world and a predefined marker, and acquiring an image including the both of the target object and the marker;

analyzing spatial stereotactic information of the marker included in the image on the basis of the acquired image, and outputting predetermined related information on the target object on a screen; and outputting suggestion information suggesting the presentation accuracy of the related information wherein a displacement between the position of the suggestion information and that of the marker on the screen indicates the presentation accuracy of the related information.

10. An information presentation apparatus comprising:

image pickup means for capturing both of a target object in the real world and a predefined marker, and for acquiring an image including the both of the target object and the marker;

related information presentation means for analyzing spatial stereotactic information of the marker included in the image on the basis of the image captured by the image pickup means, and for outputting predetermined related information on the target object on a screen; and suggestion information presentation means for outputting suggestion information suggesting the presentation accuracy of the related information wherein a displacement between the position of the suggestion information and that of the marker on the screen indicates the presentation accuracy of the related information.

* * * * *